USO07230917B1

(12) United States Patent
Fedorkow et al.

(10) Patent No.: US 7,230,917 B1
(45) Date of Patent: Jun. 12, 2007

(54) APPARATUS AND TECHNIQUE FOR CONVEYING PER-CHANNEL FLOW CONTROL INFORMATION TO A FORWARDING ENGINE OF AN INTERMEDIATE NETWORK NODE

(75) Inventors: Guy C. Fedorkow, Bedford, MA (US); Gary S. Muntz, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 1174 days.

(21) Appl. No.: 09/790,970

(22) Filed: Feb. 22, 2001

(51) Int. Cl.
*G01R 31/08* (2006.01)

(52) U.S. Cl. ............ 370/229; 370/232; 370/412; 370/428

(58) Field of Classification Search ......... 370/229, 370/230–233, 236, 412–418, 428, 429
See application file for complete search history.

(56) References Cited

U.S. PATENT DOCUMENTS

| 5,319,638 | A | * | 6/1994 | Lin ..................... 370/235 |
| 5,455,820 | A | * | 10/1995 | Yamada ................ 370/395.71 |
| 5,590,304 | A | * | 12/1996 | Adkisson ............. 711/100 |
| 5,619,510 | A | * | 4/1997 | Kurano ................. 714/712 |
| 5,732,286 | A | * | 3/1998 | Leger ................... 710/57 |
| 5,748,629 | A | * | 5/1998 | Caldara et al. ...... 370/389 |
| 5,790,522 | A | * | 8/1998 | Fichou et al. ....... 370/236 |
| 5,850,395 | A | * | 12/1998 | Hauser et al. ....... 370/398 |
| 5,872,269 | A | * | 2/1999 | Sawyer ................ 554/169 |
| 5,884,043 | A | | 3/1999 | Teplitsky |
| 5,920,568 | A | * | 7/1999 | Kurita et al. ........ 370/412 |
| 5,990,913 | A | * | 11/1999 | Harriman et al. ... 345/531 |
| 5,991,817 | A | | 11/1999 | Rowett et al. |
| 6,054,942 | A | | 4/2000 | Stemmler |
| 6,119,215 | A | | 9/2000 | Key et al. |
| 6,134,629 | A | * | 10/2000 | L'Ecuyer ............. 711/110 |
| 6,141,323 | A | * | 10/2000 | Rusu et al. ......... 370/236 |

(Continued)

OTHER PUBLICATIONS

Class-Based Weighted Fair Queueing and Weighted Random Early Detection, Cisco IOS Release 12.0(26)S.*

(Continued)

*Primary Examiner*—Wing Chan
*Assistant Examiner*—Andrew C. Lee
(74) *Attorney, Agent, or Firm*—Cesari and McKenna LLP

(57) ABSTRACT

A flow bit mechanism and technique conveys per-channel flow control information pertaining to the status of output buffers located on line cards to at least one performance routing engine (PRE) of an intermediate network node, such as an aggregation router. Each line card generates a flow bit for each of its output buffers associated with an output channel. The state of the flow bit denotes a threshold reading on the depth of the output buffer, which is preferably organized as a first-in, first-out (FIFO) queue. The depth of the output queue is compared with a predetermined threshold value. If the depth of the FIFO is below the threshold, the state of the flow bit returned to the PRE indicates that more traffic can be accepted for that channel. If the depth of the FIFO is above the threshold, the state of the flow bit indicates that further traffic is denied for the channel until there is more space on the queue. The flow bit reflects the current state of the associated output queue rather than the change in state of that queue.

42 Claims, 10 Drawing Sheets

U.S. PATENT DOCUMENTS

| | | | | |
|---|---|---|---|---|
| 6,144,635 | A * | 11/2000 | Nakagawa | 370/229 |
| 6,144,640 | A * | 11/2000 | Simpson et al. | 370/236 |
| 6,163,543 | A | 12/2000 | Chin et al. | |
| 6,324,165 | B1 * | 11/2001 | Fan et al. | 370/232 |
| 6,426,957 | B1 * | 7/2002 | Hauser et al. | 370/413 |
| 6,434,115 | B1 * | 8/2002 | Schwartz et al. | 370/235 |
| 6,452,933 | B1 * | 9/2002 | Duffield et al. | 370/415 |
| 6,513,108 | B1 | 1/2003 | Kerr et al. | |
| 6,539,024 | B1 * | 3/2003 | Janoska et al. | 370/412 |
| 6,587,463 | B1 * | 7/2003 | Hebb et al. | 370/392 |
| 6,611,522 | B1 * | 8/2003 | Zheng et al. | 370/395.21 |
| 6,631,429 | B2 * | 10/2003 | Cota-Robles et al. | 710/52 |
| 6,646,985 | B1 * | 11/2003 | Park et al. | 370/229 |
| 6,683,889 | B1 * | 1/2004 | Shaffer et al. | 370/516 |
| 6,687,247 | B1 * | 2/2004 | Wilford et al. | 370/392 |
| 6,778,529 | B1 * | 8/2004 | Field et al. | 370/353 |
| 6,785,238 | B1 * | 8/2004 | Kago | 370/236.1 |
| 6,788,699 | B1 * | 9/2004 | Yoshikawa | 370/417 |
| 6,938,094 | B1 * | 8/2005 | Keller et al. | 709/238 |
| 7,058,070 | B2 * | 6/2006 | Tran et al. | 370/412 |
| 2002/0176430 | A1 * | 11/2002 | Sangha et al. | 370/412 |

OTHER PUBLICATIONS

U.S. Appl. No. 09/791,062, G. Muntz.
U.S. Appl. No. 09/790,826, G. Muntz et al.
U.S. Appl. No. 09/791,070, G. Federkow et al.
Cisco Systems, Inc.; White Paper: Alternatives for High Bandwidth Connections Using Parallel T1/E1 Links; pp. 1-8.
U.S. Appl. No. 09/791,063, filed Feb. 22, 2001, Rachepalli et al.

* cited by examiner

APPARATUS AND TECHNIQUE FOR CONVEYING PER-CHANNEL FLOW CONTROL INFORMATION TO A FORWARDING ENGINE OF AN INTERMEDIATE NETWORK NODE

CROSS-REFERENCE TO RELATED APPLICATIONS

The present invention is related to the following copending and commonly assigned U.S. patent applications:

U.S. patent application Ser. No. 09/791,062 filed on Feb. 22, 2001 now issued as U.S. Pat. No. 6,973,072 on Dec. 6, 2005, titled, High Performance Protocol for an Interconnect System of an Intermediate Network Node;

U.S. patent application Ser. No. 09/790,826 filed on Feb. 22, 2001 now issued as U.S. Pat. No. 7,039,073 on May 2, 2006, titled, Bound Mode Technique for Accommodating High-Bandwidth Data Flow within an Intermediate Network Node; and U.S. patent application Ser. No. 09/791,070 filed on Feb. 22, 2001, titled, Mechanism and Technique for Detecting and Containing a Clock Glitch within a Clocking Subsystem of an Intermediate Network Node, each of which was filed on even date herewith and incorporated by reference as though fully set forth herein.

FIELD OF THE INVENTION

The present invention relates to flow control within a communications network and, in particular, to a flow control mechanism used in an intermediate node of a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate network node, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISP's equipment. Here, the router may be utilized to interconnect a plurality of private networks or subscribers to an IP "backbone" network. Routers typically operate at the network layer of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router, or "aggregator", is an access router configured to provide high quality of service (QoS) and guaranteed bandwidth for both data and voice traffic destined for the Internet. The aggregator also provides a high degree of security for such traffic. These functions are considered "high-touch" features that necessitate substantial processing of the traffic by the router.

More notably, the aggregator is configured to accommodate increased density by aggregating a large number of leased lines from ISP subscribers onto a few trunk lines coupled to an Internet backbone. Increased density has a number of advantages for an ISP, including conservation of floor space, simplified network management and improved statistical performance of the network. Real estate (i.e., floor space) in a POP is typically expensive and costs associated with floor space may be lowered by reducing the number of racks needed to terminate a large number of subscriber connections. Network management may be simplified by deploying a smaller number of larger routers. Moreover, larger numbers of interfaces on the access router improve the statistical performance of a network. Packet networks are usually designed to take advantage of statistical multiplexing, capitalizing on the fact that not all links are busy all of the time. The use of larger numbers of interfaces reduces the chances that a "fluke" burst of traffic from many sources at once will cause temporary network congestion.

Examples of intermediate network device platforms that may be used as aggregation routers include the 7200 Series and 12000 Series systems available from Cisco Systems, Inc. The Cisco 7200 system embodies a centralized processing engine architecture that utilizes a shared bus as the switching fabric for servicing a plurality of subscriber input links. The Cisco 12000 gigabit switch router (GSR) system, on the other hand, is based on a high-speed distributed routing architecture that utilizes a crossbar switch fabric as its switching core.

In addition to deployment at a POP, the aggregator may be deployed in a telephone company central office. The large numbers of subscribers connected to input interface ports of the aggregator are typically small to medium sized businesses that conduct a substantial portion of their operations "on-line", e.g., over the Internet. Each of these subscribers may connect to the aggregator over a high reliability link connection that is typically leased from, e.g., a telephone company provider. The subscriber traffic received at the input interfaces is funneled onto at least one trunk interface. That is, the aggregator essentially functions as a large "fan-in" device wherein a plurality (e.g., thousands) of relatively low-speed subscriber input links is aggregated onto a single, high-speed output trunk to a backbone network of the Internet.

Broadly stated, each input link may comprise a T1 or T3 connection, whereas the output trunk interface connection may comprise an OC-12 connection. A T1 connection has a data rate of 1.5 megabits per seconds (Mbps) and there are preferably 28 T1s to each T3 connection; a T3 connection thus has an effective data rate of approximately 42 Mbps. On the other hand, the effective data rate of an OC-12 trunk interface connection is typically 622 Mbps. As noted, the aggregator receives a plurality of subscriber inputs (e.g., 1000 T1 lines) and may aggregate them onto a single output trunk (e.g., an OC-12 link). However, not all T1 links are constantly in use and, through the use of statistical multiplexing, the number of input subscriber lines that can be disposed over a single output trunk at one time can be determined. For example, although the effective data input rate of 1000 T1 lines is greater than 1 gigabit per second (Gbps), the subset of T1 lines that is constantly in use (e.g., approximately 400 T1 lines) may be supported over a single 622 Mbps link (OC-12).

A common requirement for the aggregator involves the delivery of predictable QoS with which different kinds of traffic can be given different delay and queuing characteristics when congestion occurs in the router. QoS mechanisms are particularly important in networks where voice or other multimedia, real time traffic is carried along with traditional "elastic" data traffic, such as file transfer or e-mail. In these networks, it is important that voice traffic be delivered with a minimum of delay by allowing these packets to "jump ahead" of data traffic when congestion occurs.

In order to ensure that queuing priorities implemented in the aggregator are useful at the interfaces of the router, the buffers or queues that hold packets after queuing decisions are rendered, but before the packets are sent, should be maintained as small as possible. The use of queues after rendering of a priority decision may cause some degree of "head of line" blocking, where lower priority packets can delay the forwarding of high priority packets; accordingly, reducing the size of such queues is significant. While total elimination of head of line blocking is difficult, the effect is minimized in the aggregator by introducing a flow control mechanism with which the output interfaces can report the status of their output queues associated with their physical ports.

A quantitative measure of the amount of head of line blocking in an output queuing system can be characterized, in the case of the router where packets are transmitted, as packet delay variation (PDV). Delay variation expresses the amount of time that can elapse between the point in time at which an ideal scheduler would send a particular packet and the time at which the packet data is actually forwarded out of the router. If there is a long queue that may or may not be full after the scheduler makes its decision, the delay variation increases. In a router having packet interfaces such as T1 or Ethernet, PDV is also increased by the variable length nature of packet data. The scheduler may decide to send a particular high priority packet at an opportune time, but if it had just started to send a large low priority packet on a slow interface in a previous arbitration cycle, the high priority packet must wait until the low priority packet has completed.

A mechanism for transferring flow control information from an interface to the router (scheduler) must work for a few fast interfaces (such as gigabit Ethernet) and for a large number of slow interfaces (channelized DS3). The flow control mechanism must also send the flow control information quickly enough to minimize PDV but at the same time, it must not overwhelm the scheduler with too many flow control status updates. These constraints require a flow control system that can be configured to send either a large number of flow control information bits spread over a long interval (for low speed channelized interfaces) or a small number of flow control information bits sent rapidly (for high speed unchannelized interfaces).

Yet, it is desirable to maintain the size of the output queues as small as possible, primarily because the amount of storage in each queue is a direct component of the latency throughout the entire router. Such latency should be kept as low as possible, particularly for those subscribers requiring high QoS. Prior attempts to maintain "shallow" queues involve either eliminating the use a queue entirely at the port of a line card (thereby causing frequent idling of the port) or providing a large queue that results in uncontrollable delay. Thus, each queue should have a shallow depth equivalent to, e.g., approximately one (1) maximum data transfer unit (MTU)+min (1 MTU, flow control bit+scheduler latency). The depth of the queue depends on the speed of the interface. For example, the data rate through a DS1 interface port is 1.54 megabits per second (Mbps) and, accordingly, the depth of the output queue should be sufficient to accommodate at least 1 msec of such data traffic or 1.54 kilobits. If an interface is faster (e.g., a DS3) then more queue space is needed for the same amount of time. Therefore to ensure "good" QoS, the depths of all buffers should be controlled (i.e., kept shallow) within the router; the present invention is directed, in part, to ensuring control over such buffers.

By keeping the capacity of each output queue to less than 1 msec of its line data rate, there should be less than 1 msec of latency throughout the output buffers. However, the use of such shallow buffers requires constant status information to the scheduler in order to avoid overflow and underflow conditions. An underflow condition arises when there are potentially packets to send but no traffic is being forwarded over the line. On the other hand, an overflow condition arises when a packet to be sent cannot be stored in the buffer and is discarded. In an aggregator having thousands of output queues, each of which must be polled by the scheduler for status pertaining to its depth, a substantial amount of "overhead" control information must be transferred between the interfaces and the scheduler of the router.

One way to transmit such information is to provide additional wires that essentially comprise a separate data path in the aggregator. However, a separate data path substantially increases the cost of the aggregator because of the addition of its constituent wires. In addition, the separate data path must operate fast and efficiently because of the substantial amount of information carried thereon. The present invention is directed to a technique for efficiently transporting such flow control information between interfaces and a scheduler of an aggregator. More specifically, the present invention is directed to a mechanism for conveying per channel flow control information to a forwarding engine of an aggregator wherein the flow control information is used to manage the depths of output queues located on line cards of the aggregator.

SUMMARY OF THE INVENTION

The present invention comprises a flow bit mechanism and technique that conveys per-channel flow control information pertaining to the status of output buffers located on line cards to at least one performance routing engine (PRE) of an intermediate network node, such as an aggregation router. The line cards include input cards having input ports coupled to subscribers and at least one trunk card configured to aggregate packets received from the subscriber inputs over at least one output port. The PRE performs packet forwarding and routing operations, along with quality of service (QoS) functions for the packets received from each input line card over an interconnect system. To that end, the interconnect system comprises a plurality of high-speed unidirectional (i.e., point-to-point) links coupling the PRE to each line card.

According to the invention, each line card generates control information, i.e., a flow bit, for each of its output buffers associated with an output channel. The state of the flow bit denotes a threshold reading on the depth of the output buffer, which is preferably organized as a first-in, first-out (FIFO) queue. That is, the depth of the output queue is compared with a predetermined threshold value. If the depth of the FIFO is below the threshold (e.g., empty), the state of the flow bit returned to the PRE indicates that more traffic can be accepted for that channel. If the depth of the FIFO is above the threshold, the state of the flow bit (e.g., full) indicates that further traffic is susceptible to overflow and, therefore, is denied for the channel until there is more space on the queue. Notably, the flow bit is defined to reflect the current state of the associated output queue rather than the change in state of that queue. That is, as long as a FIFO can accept traffic, its flow bit continues to be asserted whereas it will remain not asserted for as long as the FIFO cannot accept another packet.

To provide predictable transmission of flow control information while minimizing the number of pins used with the interconnect system, the aggregation router utilizes a time division multiplex (TDM) arrangement to carry the flow bits over a set of interconnect links. These point-to-point links comprise a data path of the interconnect system configured to transport packet data from the line cards to the PRE; the TDM arrangement multiplexes the flow bits as logically separate signals over those links. Illustratively, the TDM arrangement periodically transmits one flow bit from each line card to the PRE, e.g., every 90 nanoseconds (nsecs), regardless of packet activity. The flow bits can be further multiplexed onto channels through the imposition of a framing structure, allowing sets of flow bits to be associated with particular channels on a line card.

The framing structure defines a frame cycle, the length of which is selected such that the maximum flow bit period for one channel (1 flow bit per cycle) corresponds to the time required to send a near-minimum length packet over the slowest connection supported by the system, e.g., a DS0 channel. In the illustrative embodiment, the flow bit frame interval is preferably 64K bits in length. At 90 nsecs per flow bit, the frame time is approximately 6 milliseconds (msecs) allowing at least one flow bit from the frame to be assigned to control a single DS0 channel with the minimum packet time being approximately 5 msecs. Using this framing structure, the aggregation router may support up to 64K interfaces per line card with interfaces as slow as 56 or 64K bits per second. For faster interfaces, additional bits in the frame are assigned to a single interface allowing transmission of flow control for a smaller number of faster channels.

Advantageously, the flow bit mechanism and technique manages a per-channel-to-line depth of the output buffers and conveys that status to the PRE through use of a 1-bit threshold indicator of each buffer depth with tight guarantees on the sample rate. Slower channels are sampled infrequently since they cannot "drain" quickly enough to require frequent sampling. Faster channels are sampled more often but at evenly spaced intervals. The output buffers are kept as small as possible to minimize the time between a scheduling decision on the PRE and the actual transmission of a packet over the output interface. Such a short time interval obviates the need for the line card to provide any "fancy" queuing primitives. Moreover, shallow buffers enable efficient management of packet delay variation and low speedup interconnect bandwidth.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
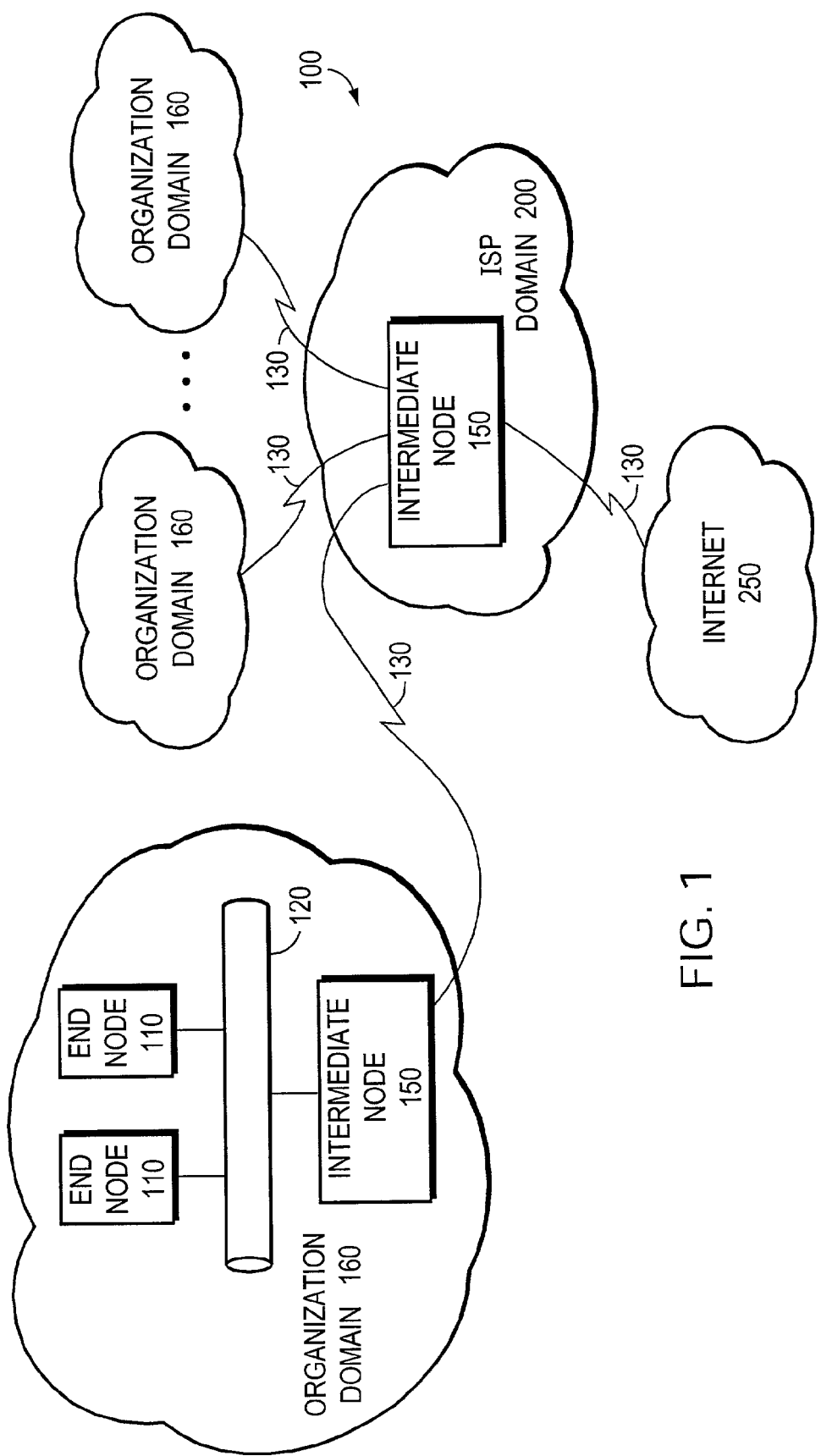
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
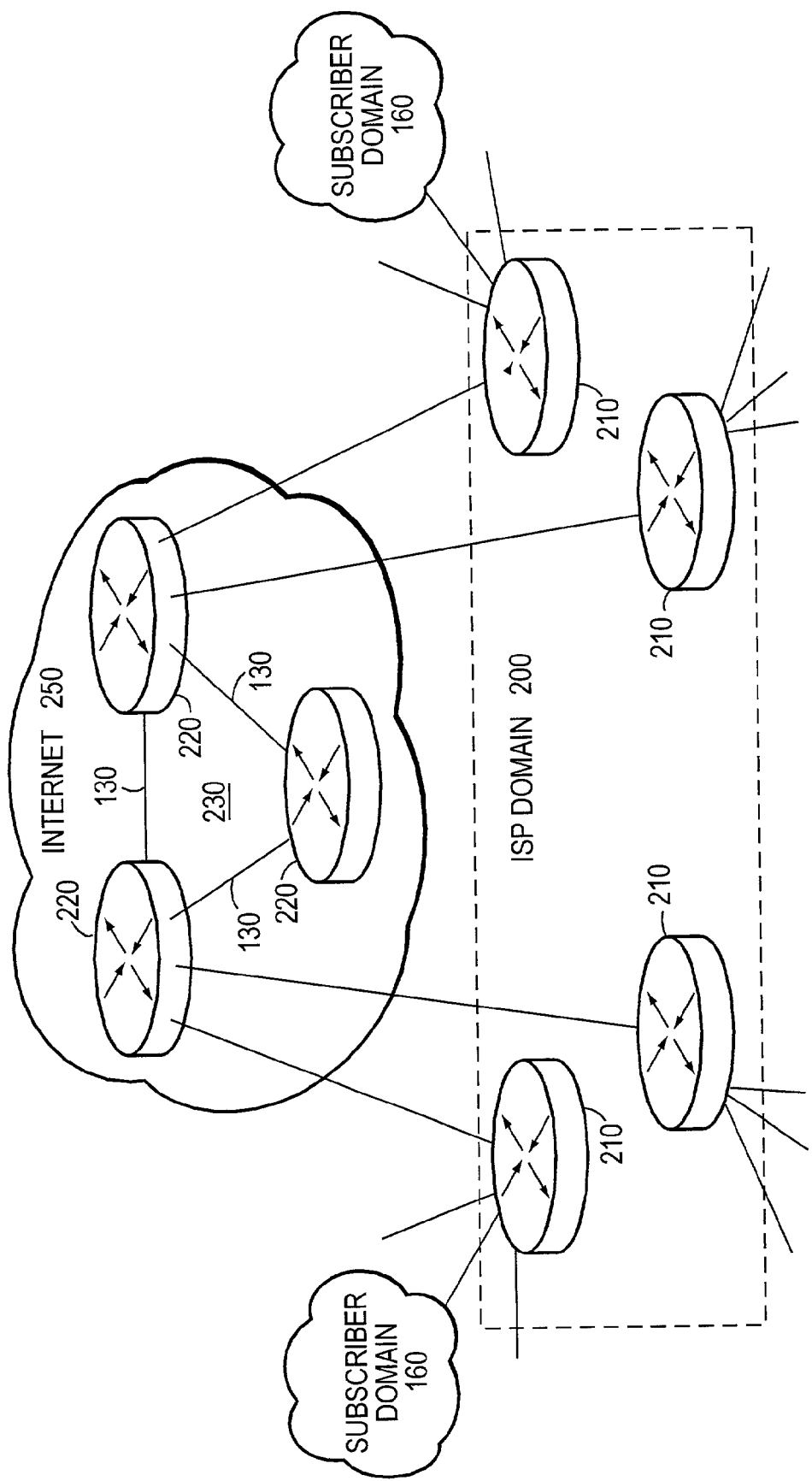
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization domain 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
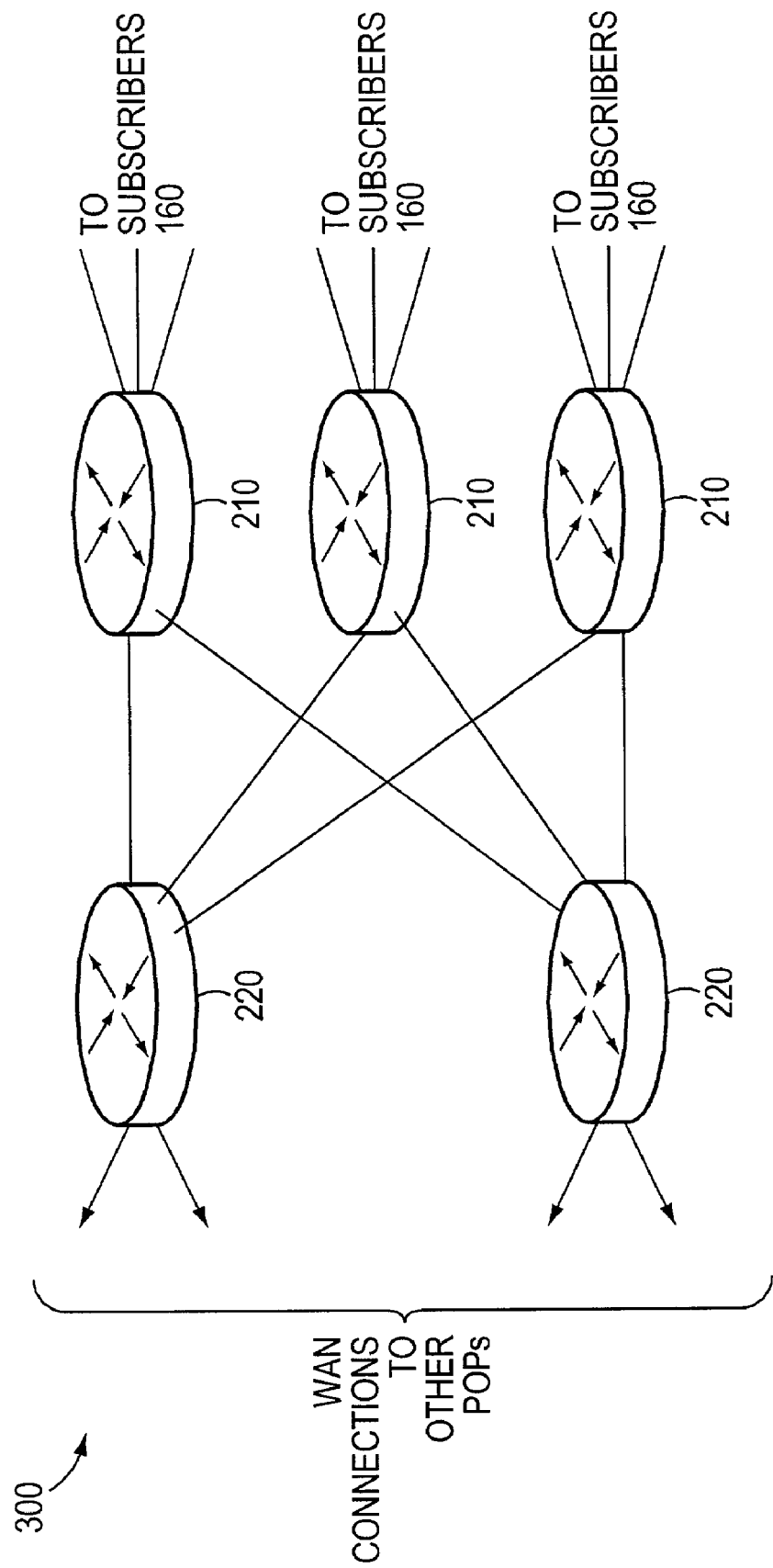
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

In general, the access router 210 serves as a "front line" for an ISP 200, connecting directly to routers on the subscribers' premises. However, there is usually a complex circuit-switched infrastructure that transports, e.g., a leased line signal a "last mile" between the subscriber premises and the POP 300. There are many ways of constructing the last-mile network; one technique for new installations is based on metropolitan-area fiber-optic ring technology. These fiber-optic network installations may be based on Synchronous Optical Network (SONET) or Synchronous Digital Hierarchy (SDH) standards. SONET/SDH technology is desirable in transport networks that provide leased line connectivity to subscriber routers because of the high capacity of fiber-optic cables and the high-density, industry-wide standard interface between network transport equipment and the equipment that uses the transported signals, such as aggregation routers.

Figure 4:
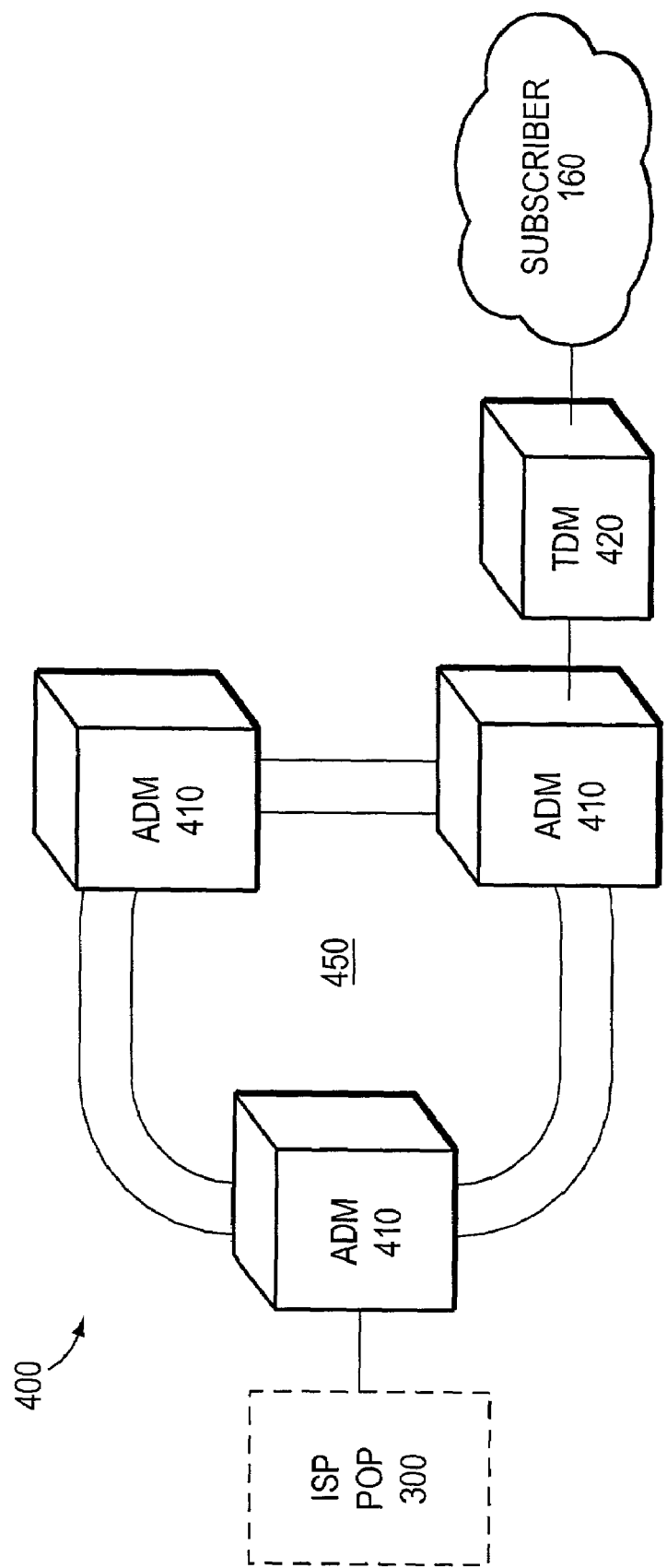
FIG. 4 is a schematic block diagram of a Synchronous Optical Network (SONET) metropolitan-area transport network that may be advantageously used with the present invention.

FIG. 4 is a schematic block diagram of a SONET metropolitan-area transport network 400 that may be advantageously used with the present invention. The SONET network 400 transports 1.544-Mbps DS1 and 44.736-Mbps DS3 signals from a subscriber site 160 across a fiber-optic ring 450 to an ISP POP 300. To that end, the SONET network 400 comprises a TDM device 420 configured to multiplex a plurality of (e.g., 28) DS1 circuits to fill a DS3 circuit. In addition, the network 400 comprises a plurality of add drop multiplexers (ADMs 410) configured to "drop-off" either DS1 or DS3 circuits onto, e.g., an OC-48 SONET fiber.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 5:
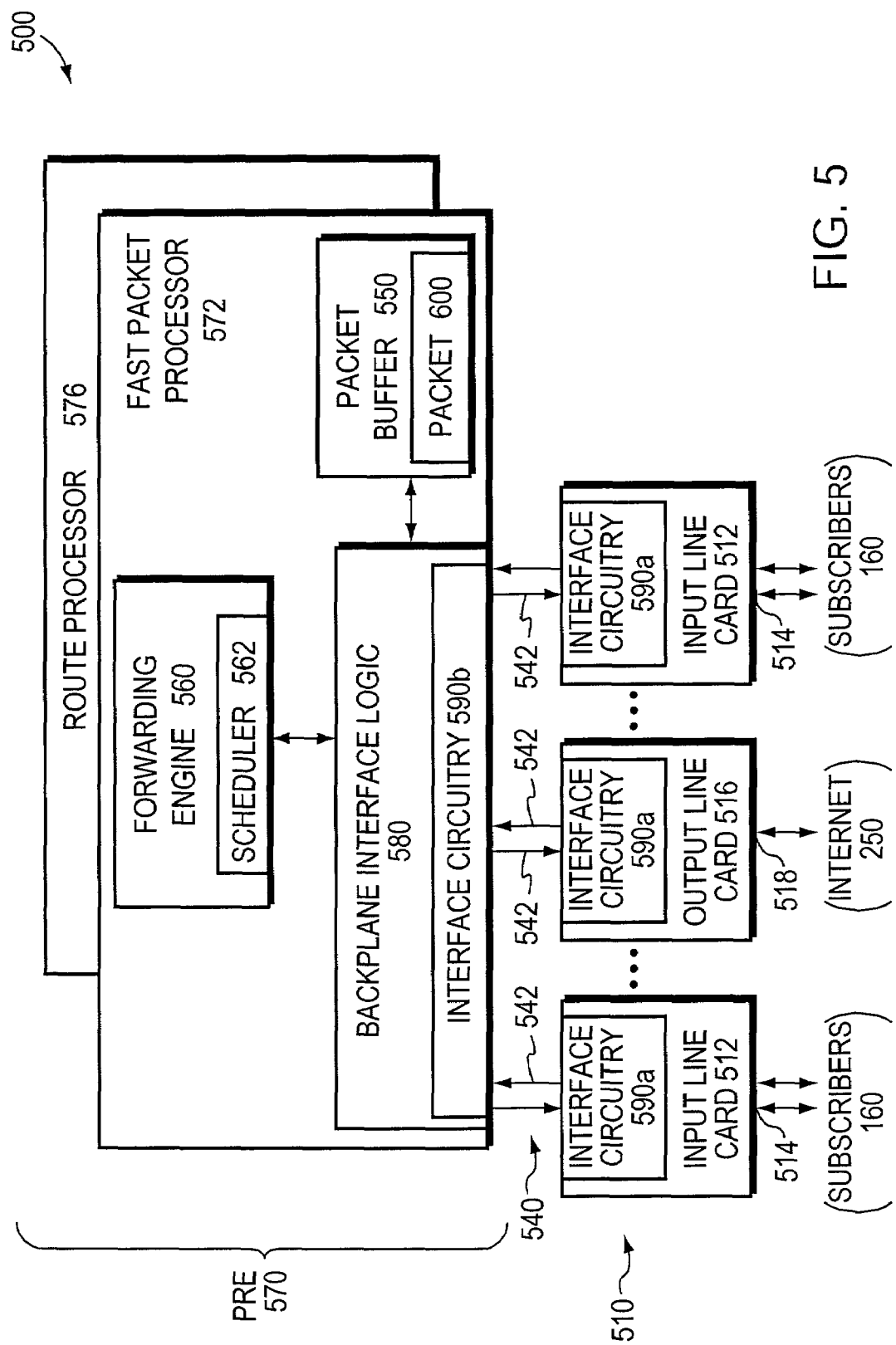
FIG. 5 is a schematic block diagram of an aggregation router in accordance with the present invention.

FIG. 5 is a schematic block diagram of an aggregation router 500 in accordance with the present invention. The aggregation router ("aggregator") comprises a plurality of line cards 510 coupled to at least one performance routing engine (PRE 570) via a unidirectional (i.e., point-to-point) interconnect system 540. The line cards 510 include a plurality of input cards 512 having input interface ports 514 coupled to subscribers 160 and at least one output "trunk" card 516 configured to aggregate the subscriber inputs over at least one output interface port 518. The PRE 570 is an assembly comprising a fast packet "forwarding" processor (FP) module 572 and a route processor (RP) module 576 adapted to perform packet forwarding and routing operations, respectively. The FP and RP modules are preferably interconnected in a "mezzanine" arrangement to form the PRE 570. The PRE assembly also provides quality of service (QoS) functions for complete packets received from each input line card over the interconnect system.

To that end, the interconnect system 540 comprises a plurality of high-speed unidirectional (i.e., point-to-point) links 542 coupling the PRE to each line card 510. The links are preferably clock forwarded links such that each unidirectional link comprises two data "wire pairs" for transporting the data signals and one clock wire pair for carrying clock signals. However, it will be understood to those skilled in the art that the clock forwarding technique may scale to accommodate other clock forwarding arrangements such as, e.g., four data signals for each accompanying clock signal.

The RP module 576 is a processor-based, routing system suite comprising functionality incorporated within a typical router. The FP module 572, on the other hand, is responsible for rendering forwarding decisions for the aggregation router and includes a forwarding engine 560 (such as an arrayed processing engine) coupled to a high-performance backplane interface logic circuit 580. The forwarding engine 560 is preferably embodied as two high performance "chips", e.g., application specific integrated circuits (ASICs) having a plurality of processors arrayed as four (4) rows and eight (8) columns in a 4×8 arrayed configuration, wherein each column is coupled to a column memory. However, it will be understood to those skilled in the art that other arrayed configurations, such as an 8×2 or 8×8 array, may be used in accordance with the present invention. The column memory preferably comprises synchronous dynamic random access memory (SDRAM) storage locations addressable by the forwarding engine 560 for storing software code and data structures accessed by the processors. The software code is preferably a binary, assembly language image or micro-code adapted for execution by processors of the engine 560. It will be apparent to those skilled in the art that other memory means, including various computer readable media, may be used for storing and executing program instructions pertaining to the operation of the forwarding engine and router.

In the illustrative embodiment, the aggregator 500 includes sixteen (16) line cards 510, each of which is configured for an OC-12, i.e., 622 megabits per second (Mbps), data rate. Thus, the point-to-point links 542 coupled to the line cards must be capable of supporting such data rates. Accordingly, an interconnect protocol is provided that enables encoding of packets 600 over the point-to-point links 542 of the interconnect system to thereby limit the bandwidth consumed by overhead when transmitting the packets within the aggregation router. An example of an interconnect protocol that may be advantageously used with the present invention is disclosed in co-pending and commonly-owned U.S. patent application Ser. No. 09/791,062 filed on Feb. 22, 2001 now issued as U.S. Pat. No. 6,973,072 on Dec. 6, 2005, titled High Performance Protocol for an Interconnect System of an Intermediate Network Node, which application is hereby incorporated by reference as though fully set forth herein.

Figure 6:
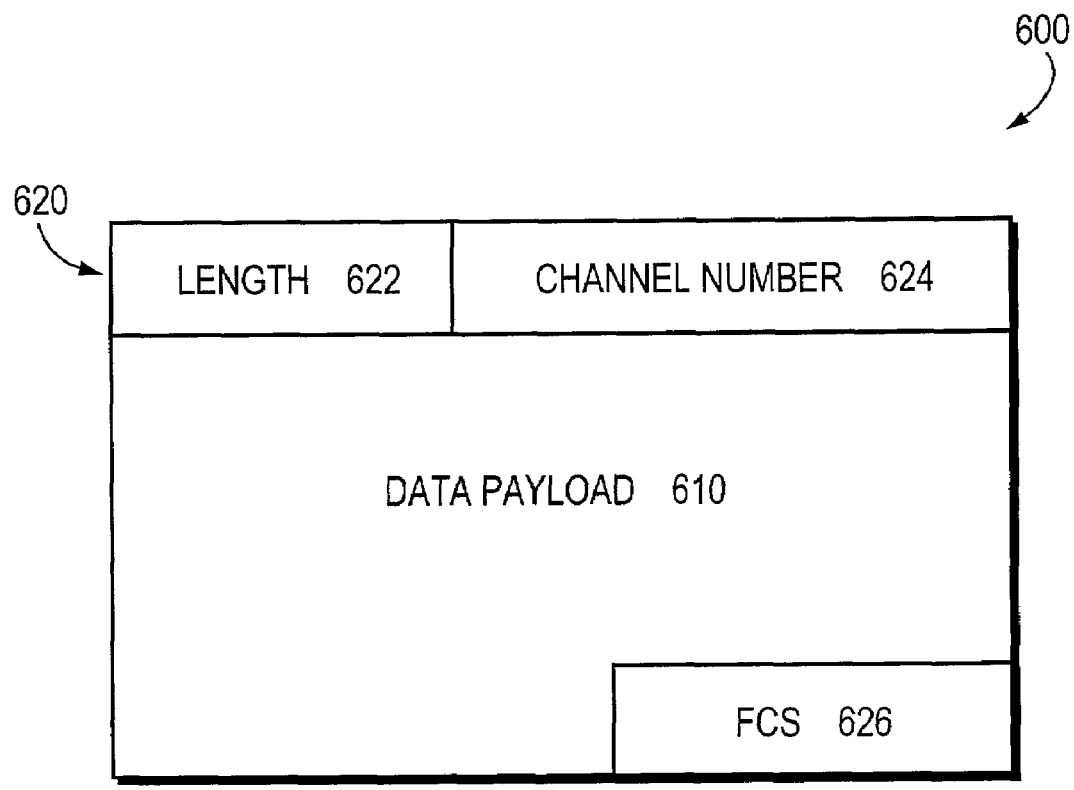
FIG. 6 is a schematic block diagram illustrating the format of a packet that may be advantageously used with the present invention.

FIG. 6 is a schematic block diagram illustrating the format of a packet 600 that includes a data "payload" portion 610 and an interconnect header 620, the latter comprising, inter alia, a length field 622 and a channel number field 624. The content of the length field 622 indicates the length (i.e., the number of bytes) of the packet 600 (including the header 620) as it is transmitted over the link. The content of the channel number field 624 is a channel number of a source or destination port for the packet 600. That is, the channel number is preferably an identifier unique to a single packet flow of a line card. The channel number field 624 enables a substantial number (e.g., thousands) of different subscribers to efficiently interleave their packet data over a single point-to-point link 542, while allowing receiver circuitry to uniquely identify each packet 600 during a data recovery process. An FCS field 626 is appended to the end of the interconnect packet and contains error checking information, such as a cyclic redundancy check (CRC) code, used to verify the integrity of the data.

Interface circuitry 590 coupled to the ends of the unidirectional links 542 is resident on both the line cards 510 and a backplane logic circuit 580 of the PRE 570. The backplane logic circuit 580 is preferably embodied as a high performance ASIC, hereinafter referred to as the Cobalt ASIC, which is configured to further interface the line cards to a packet buffer 550 of the PRE. An example of a backplane logic circuit that may be advantageously used with the present invention is disclosed in co-pending and commonly-owned U.S. patent application Ser. No. 09/791,063 filed on Feb. 22, 2001, titled High Performance Interface Logic Architecture of an Intermediate Network Node, which application is hereby incorporated by reference as though fully set forth herein.

The interface circuitry 590 preferably implements a unidirectional, point-to-point clock forwarding technique that is configured for direct ASIC-to-ASIC transmission over a backplane of the aggregation router. As a result, interface circuitry 590a resident on the line cards 510 is preferably embodied within a high-performance ASIC, hereinafter referred to as the Barium ASIC, whereas interface circuitry 590b is resident on the Cobalt ASIC. The interface circuitry 590 generally functions as a translator that converts conventional formats of data received at the line cards 510 to a protocol format for transmission from, e.g., the Barium ASIC over the interconnect system 540 to the Cobalt ASIC.

Specifically, packets 600 are transmitted, one after another, over the links 542 as a byte stream embedded in time division multiplexing (TDM) framing. Although line cards 510 may process many packets at a time on external interfaces, the packets are sent as a contiguous stream of bytes over the links 542. The TDM framing includes information denoting the meaning of the byte stream and a method to control its flow. The interconnect protocol embeds this information in a "9th bit" column of a frame, multiplexing much of it into a framing bit. To that end, the protocol is directed to framer logic configured to "frame" and recover valid packet data within a stream of data bytes. That is, framers are provided at a transmitter of the interface logic 590 to generate encoded frames from a stream of packet data (bytes) for transmission over the links and at a receiver of the logic 590 to recover the transmitted packet data from the frames.

A frame is a minimum group of bits that is repeated within a framing pattern; it is one cycle of the pattern, carrying a single framing bit. As described further herein, the frame identifies byte boundaries and marks bytes that correspond to start-of-packet (SOP). An encoded frame preferably includes a plurality of SOP indicators (e.g., one every even byte in the packet data path) such that a maximum delay to begin transmitting a packet over a point-to-point link is generally short, e.g., sixteen (16) bits, which substantially reduces latency of packet transmission. The frame is also the window used to find a frame synchronization pattern (i.e., frame sync). The frame corresponds to a hardware clock domain transition, where bytes aligned to a slower ASIC internal clock domain are transposed to bits that are aligned to a synchronous 200 MHz clock domain (or vice versa). The frame consumes a constant amount of time, independent of the number of data signals used.

Figure 7:
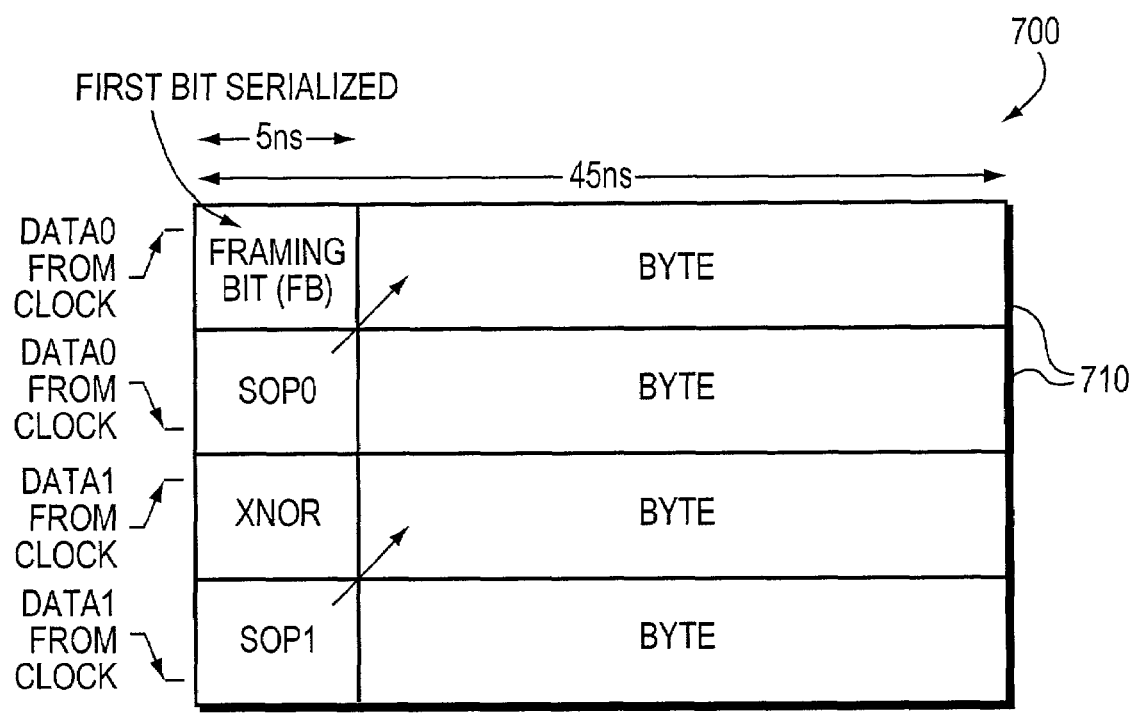
FIG. 7 is a schematic block diagram illustrating the format of an encoded frame that may be advantageously used with the present invention.

FIG. 7 is a schematic block diagram illustrating the format of an encoded frame 700. The frame 700 comprises a plurality of rows 710, each containing 9 bits of which 8 bits (one byte) comprises packet data and 1 bit (the "$9^{th}$ bit") comprises control information. For each data signal, the $9^{th}$ bit sampled on the falling edge of a clock signal is a SOP indicator that is asserted if a packet begins on this data signal in the current frame. In the illustrative embodiment, a value "1" indicates a SOP. In response to this indication, the first byte of a packet is recovered from the data sampled by a rising edge of a clock and the second byte is recovered by sampling the data with a falling edge of the clock. The packet continues in the next higher-numbered data signal row of the present frame or continues in the data signal 0 of the next frame. The 9th bit sampled on the rising edge of data zero is the framing bit (FB) and is used in many ways, depending on the number of the present frame (i.e., a 17-bit frame number) within a frame cycle. The XNOR bit is calculated as, e.g., !(SOP0 XOR SOP1), and has the properties of (i) checking for data integrity of the link and (ii) ensuring the frame sync pattern can't happen normally (i.e., frame sync violates the XNOR rule). (See U.S. patent application Ser. No. 09/791,062, now issued as U.S. Pat. No. 6,973,072 and incorporated hereinabove by reference, for a more complete description.)

The packet buffer 550 is a memory that preferably comprises SDRAM devices used to store packets 600 as the forwarding engine 560 determines where and when they should be forwarded within the aggregator. For example, the packet buffer may be used to store low priority data packets while high priority, low latency voice packets are forwarded by the forwarding engine to an output card (e.g., the trunk card 516) of the aggregator. In addition, the packet buffer 550 holds all packets that have been processed by the forwarding engine 560 but are waiting to be transmitted to an output port. The packets remain in the packet memory until an output channel is able to send another packet and scheduler software 562 executing on the forwarding engine has chosen the next packet to be sent on that channel. A channel and line card number are a logical representation of a subscriber.

In the illustrative embodiment, the packet memory 550 is organized as a group of queues per output channel. For typical first-come, first-served routing, a single queue per output channel is sufficient. However, for advanced layer 3 QoS services, such as weighted fair queuing, several queues per output channel are required. To properly schedule traffic to the output port, the scheduler 562 must have access to transmit status of each output channel. This is accomplished by sending flow control information from each channel back to the scheduler. When the forwarding engine prepares to dequeue a packet to an output buffer of an outgoing channel, it (i) checks a flow bit (described further herein) to determine whether a packet should be sent; (ii) if so, finds the highest-priority packet to be sent to the channel; and (iii) sends the packet.

In order to ensure that queuing priorities implemented by the scheduler are useful at the interfaces of the aggregator, the queues that hold packets after queuing decisions are rendered, but before the packets are sent, should be maintained as small as possible. The use of queues after rendering of a priority decision may cause some degree of "head of line" blocking, where lower priority packets can delay the forwarding of high priority packets; accordingly, reducing the size of such queues is significant. While total elimination of head of line blocking is difficult, the effect is minimized in the aggregator by introducing a flow control mechanism with which the output interfaces can report the status of their output queues associated with their physical ports.

The aggregator of the present invention utilizes several layers of flow control to regulate the amount of traffic flowing from the forwarding engine to each output channel. Two of these flow control mechanisms traverse a backplane of the interconnect system 540. A first mechanism involves the point-to-point paths between the PRE and each of the 16 line cards; each path is managed with a single, link-level control bit. This control bit may be asserted by a line card to stop all traffic coming from the PRE to the line card. Although, this "link-level" flow control mechanism is fast, it blocks all traffic to the line card, thereby causing head of line problems for multi-port cards. The second flow control mechanism comprises an arrangement wherein each output channel has its own flow control path from the output channel hardware on the line card to the forwarding engine scheduler. This "channel level" flow control mechanism can regulate thousands of separate channels without head of line problems.

Further to the illustrative embodiment, each line card includes a buffer associated with each subscriber or channel that is configured to store packets for delivery from the PRE over the "line". The buffer is preferably organized as a first-in, first-out (FIFO) queue. The scheduler 562 determines which packet should be loaded into that output FIFO for delivery over the line. There may be as many as ten thousand output FIFO queues within the aggregator, wherein each output FIFO is associated with a subscriber. The forwarding engine forwards the processed packets to the FIFO queues in a "bursty" manner that, over time, equals the bandwidth acceptable to the subscribers. Preferably, the depth of these queues should be maintained as shallow as possible to reduce latencies in the router.

A primary function of the scheduler 562 is to keep each FIFO from overflowing and underflowing. An underflow condition arises when there are potentially packets to send but no traffic is being forwarded over the line. On the other hand, an overflow condition arises when a packet is sent to the line card, but it cannot be stored in the FIFO and is discarded. In accordance with the present invention, a flow bit mechanism and technique is provided that conveys per-channel flow control information pertaining to the status of output FIFO queues to the scheduler of the PRE. Each line card generates control information, i.e., a flow bit, for each of its output queues per outgoing channel. This information is sampled and sent to the PRE on a rigid periodic schedule. The flow bits are used to communicate the depths of the FIFO queues to the PRE to substantially reduce (or eliminate) overflow and underflow conditions of the buffers.

Specifically, the state of the flow bit denotes a threshold reading on the depth of the output FIFO queue. That is, the depth of the output FIFO is compared with a predetermined threshold value. If the depth of the FIFO is below (i.e., less than) the predetermined threshold value (e.g., empty), the state of the flow bit returned to the PRE indicates that more traffic can be accepted for that channel. Specifically, the flow bit state indicates that another packet from the PRE will fit in the buffer, whatever its size. If the depth of the FIFO is above (i.e., greater than) the threshold value, the state of the flow bit (e.g., full) indicates that further traffic is susceptible to overflow and, therefore, no further traffic destined for this channel should be sent until there is more space on the queue. In other words, if the depth of the output FIFO is greater than the predetermined threshold value, no further data traffic can be reliably accepted at that output buffer. Consequently, the scheduler refrains from sending a packet to that queue until the next time it considers sending a packet to that queue; at that time, the state of the flow control bit is again evaluated. Notably, the flow bit is defined to reflect the current state of the associated output queue rather than the change in state of that queue. That is, as long as a FIFO can accept traffic, its flow bit continues to be asserted whereas it will remain not asserted for as long as the FIFO cannot accept another packet. The state of the flow bit (as a result of the comparison operation with the threshold) is stored in the FB field of the frame.

Whereas the scheduler indicates "which packet is next" for transmission to an output queue, the novel flow bit indicates "when to send the next packet" to that queue. A representative pseudo code segment of a scheduling algorithm is as follows:

Loop on all K, wherein K represents 1 of 10,000 subscribers
  Check subscriber K
  If flow bit says "not full"
  Send a packet to K
  Else nothing As indicated above, the scheduler 562 polls the output queue associated with each subscriber and if the flow bit associated with that queue indicates that there is storage capacity for a packet, the scheduler sends a packet to that queue. If the flow bit indicates that there is not sufficient storage space for a packet, the scheduler skips sending a packet to that queue and checks the status of that queue on the next cycle. The scheduler actually samples the status of the FIFO depths faster than those queues can accept the packets and if a flow bit indicates that a packet should not be sent to a queue, the scheduler "backs off" and refrains from sending the packet until the next cycle. In order to correlate the state of the flow bit with a particular queue, the content of the frame number field associated with the frame is used, as described further herein.

The interconnect protocol and, in particular, its frame format are configured to accommodate packet data at full data rate (e.g., OC-12) along with control information such as flow bits, frame sync and SOP indicators. To provide predictable transmission of flow control information while minimizing the number of pins used with the interconnect system, the aggregation router utilizes a TDM arrangement to carry the flow bits over a set of interconnect links. As noted, these point-to-point links 542 comprise a data path of the interconnect system 540 configured to transport packet data from the line cards to the PRE; the TDM arrangement multiplexes the flow bits as logically separate signals over those links. Specifically, the TDM arrangement periodically transmits one flow bit from each line card to the PRE, e.g., every 90 nanoseconds (nsecs), regardless of packet activity. The flow bits are multiplexed onto channels through the imposition of a framing structure, allowing sets of flow bits to be associated with particular channels on a line card. In particular, the novel flow bits are transported over the point-to-point interconnect links 542 as "out-of-band" flow information within the framing bit of a frame 600.

The framing structure defines a frame cycle or superframe, the length of which is selected such that the minimum flow bit rate for one channel (1 flow bit per cycle) corresponds to the time required to send a minimum length packet over a minimum speed interface, e.g., a DS0 channel. The novel flow bit invention is therefore designed to be just fast enough to keep up with the slowest supported port on the aggregator. In the illustrative embodiment, the superframe period should approximately equal the minimum packet period on the slowest link, e.g., 1 flow bit/superframe or about as often as the scheduler loop. Moreover, the superframe period should be a power of 2 times the frame period. Combining the above, the minimum packet period is approximately 5 msecs, which fits well with about 6 msecs in $2^{17}$ frames. The expected highest speed link using the 1 flow bit path is OC-48; therefore, 1 flow bit per minimum packet or 133 nsecs is needed on an OC-48 link to keep the scheduler up-to-date. However, 133 nsecs is more than 2 frames, but less than 4 frames, so 2 frames or 90 nsecs is chosen for the flow bit period. Dividing the superframe period by the flow bit period provides the number of flow bits in a superframe, e.g., $2^{17}/2^1 = 2^{16}$. Using this framing structure, the aggregation router may support up to 64K interfaces per line card with interfaces as slow as 56 or 64K bits per second. For faster interfaces, additional flow bits in the superframe are assigned to a single interface allowing transmission of flow control for a smaller number of faster channels.

A full flow bit frame allows the PRE to receive up to 64K different flow bits from each line card each 6 msecs; this represents a substantial amount of flow control information. To be useful, these bits must be allocated to interfaces with the following constraints. Each interface must receive enough flow bits in the frame to stay within a packet delay variation (PDV) guideline for that interface. Fast interfaces need several flow bits per frame. For example, while a DS0 may need one or two flow bits per frame to yield flow control feedback once per minimum packet, a DS1 channel could use eight flow bits out of the frame to achieve reduced PDV.

Multiple flow bits assigned to a single channel should be evenly spaced in the frame. The rules for assigning flow bits to interfaces should accommodate mixtures of fast and slow interfaces while providing even spacing. Finally, to reduce the processing load at the forwarding engine, the number of flow bits in the frame that are actually used should be minimized. Assignment of flow bits to interfaces is preferably accomplished under control of software, operating within some constraints imposed by hardware. Therefore, assignment of flow bits does not need to be fixed in advanced for all line cards.

Figure 8:
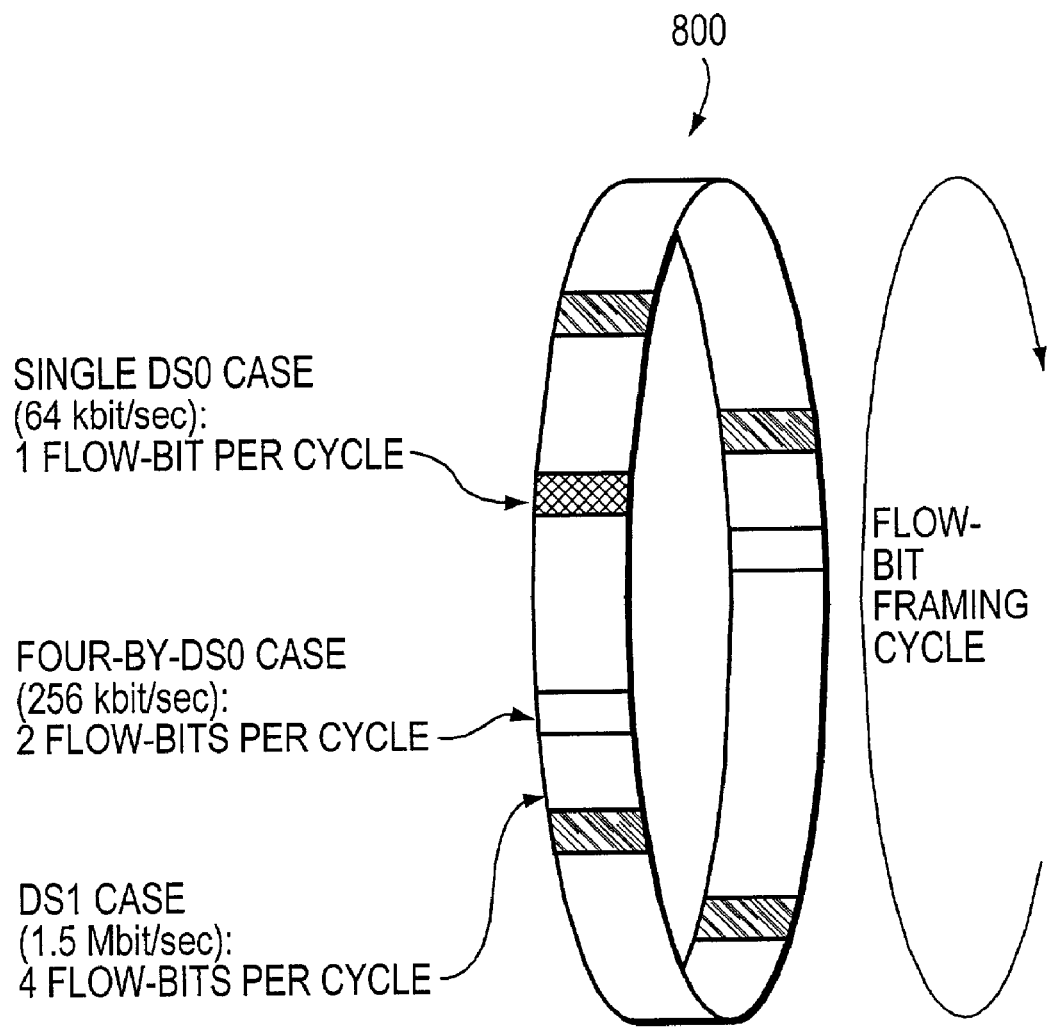
FIG. 8 is a schematic diagram of a framing cycle wheel illustrating an assignment of flow bits per frame cycle to interfaces of the aggregation router in accordance with the invention.

FIG. 8 is a schematic diagram of a framing cycle "wheel" 800 illustrating an assignment of flow bits per frame cycle to interfaces having various data rates within the aggregator. In an embodiment wherein the aggregator supports multiple DS0 ports, multiple flow bits per superframe may be used. The superframe denotes the amount of time needed to "wrap around" the 17-bit frame number and issue all of the $2^{17}$ values to the forwarding engine 560. In the illustrative embodiment, the superframe comprises 6 msecs. A single DS0 per channel case involves 1 flow bit per superframe, whereas a DS1 per channel case requires several flow bits per superframe. In the single DS0 subscriber case, the flow bit is sampled once per cycle (every 6 msec) by the scheduler 562. During that cycle all other subscribers are sampled at least once. In the DS1 case, only one channel and buffer are assigned to the DS1 channel queue, but that buffer's depth is sampled more frequently by the scheduler since it is assigned to a faster channel than the DS0 channel. Here, the sampling "slots", and the flow bits sent in those slots, are evenly spaced throughout the framing cycle.

For example, assume that an interface is sampled twice per superframe. According to a mapping arrangement between the frame number and channel number, the sampling "slots" allocated to this particular interface may be frame number 0x31 and frame number 0x10031 (i.e., $31+2^{17}/2=65,567$), an evenly spaced slot interval within the cycle. In this latter case each time the line card sends the flow bit status for the particular queue, that status represents the results of the comparison operation between the threshold and the depth of a queue. Thus, according to this TDM scheme, a particular channel may have many time slots within the framing cycle such that the frequency of sampling is much faster than once per cycle.

The definition of the framing bit is multiplexed by the value of a 17-bit frame cycle counter located at the transmitter and receiver circuitry. The frame cycle counter is initialized by frame sync and is incremented once per frame. A framing cycle is therefore $2^{17}$ frames in length or approximately six milliseconds (msecs). A value of all 1's in the counter wraps to 0, restarting the framing cycle. When the value of the frame cycle counter is not all 1s, the value of the framing bit may be used as a flow bit. For half of the frames transmitted over the point-to-point links, the value of the framing bit is defined as the value of the flow bit. In other words, every other frame issued over the point-to-point links encodes a flow bit within the FB field of the frame 700. The flow bit together with the frame number denotes the channel level flow control for a particular output queue associated with a channel or subscriber.

Figure 9:
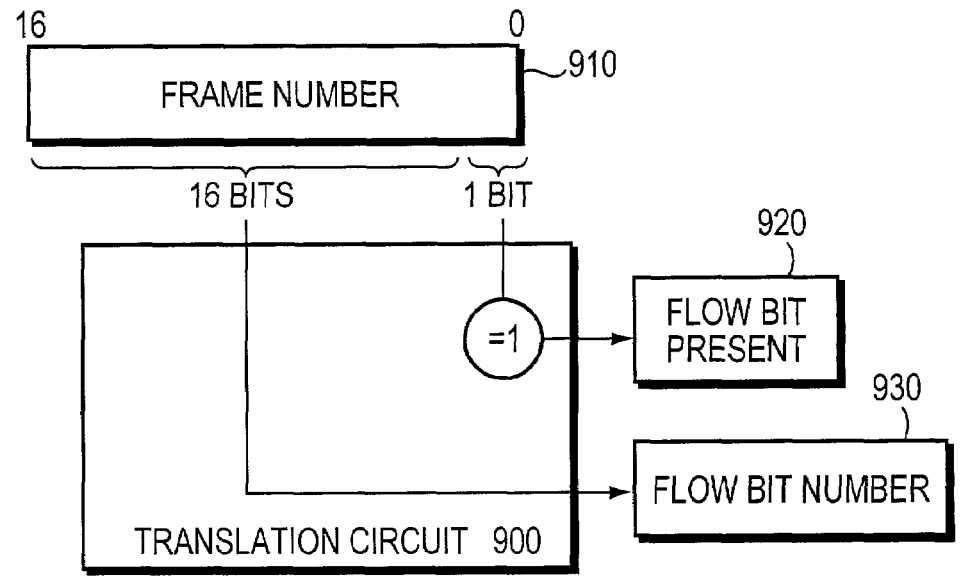
FIG. 9 is a schematic block diagram of a translation circuit configured to translate a frame number into a flow bit and a flow bit number in accordance with the present invention.

Upon initialization of the point-to-point links, frame sync is generated and the next frame transported over the links is frame number 0. Thus, the frame number is generated at the transmitter and receiver in response to frame sync. As noted, the frame number is a 17-bit value; the least significant bit (LSB) of this value is interpreted by a flow bit circuit as the flow bit and the remaining 16 bits are interpreted by that circuit as a flow bit number. FIG. 9 is a schematic block diagram of a conventional translation circuit 900 configured to translate a 17-bit frame number 910 to the presence of a flow bit 920 and a 16-bit flow bit number 930. The circuit 900 comprises logic circuitry configured to, when the flow bit presence 920 is asserted, interpret the remaining 16 bits of the frame number field 910 as the flow bit number 930. The flow bit number 930 is then mapped (not necessarily directly) to a channel number associated with a particular output queue contained on a line card coupled to the point-to-point links 542 over which the flow bit 920 is transported. As the frame number increments, the channel number "walks through" the map thus enabling each output queue to provide the status of its depth to the forwarding engine 560 via the novel flow bit.

In an embodiment of the present invention, the mapping between the frame number and channel number is performed using a random access memory (RAM). In the illustrative embodiment, however, the mapping is performed by a combinatorial logic circuit with configuration information that exploits the fact that, from a practical standpoint, the number of samples within a framing cycle is always a power of 2. The line card is configured with a relationship between the channel number loaded into field 624 of the interconnect header 620, the generated flow bit number 930 and the port (of a multi-port line card) to which the packet is destined. A port may have many channels; for example, a DS3 can support up to 28 T1 (DS1) ports, each of which can support up to 24 DS0 lines. Thus, it is clear that a channel may be a subset of a particular port and the output queue is associated with each channel. In sum, a channel is equal to a subscriber and there may be many (thousands) of channels per port.

Figure 10:
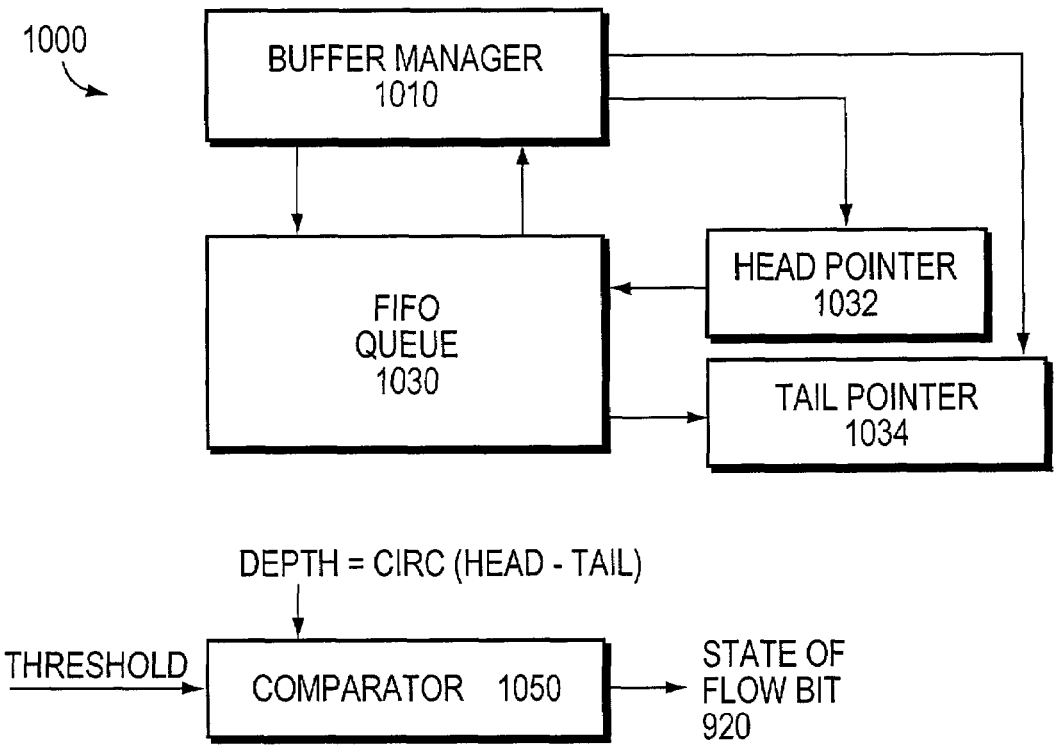
FIG. 10 is a schematic block diagram of a flow bit circuit configured to generate a flow bit in accordance with the present invention.

FIG. 10 is a schematic block diagram of a flow bit circuit 1000 located on a line card and is configured to perform a threshold measurement to generate a state of a flow bit 920 every time a flow bit for a channel is sent to the scheduler. The logic circuitry 1000 comprises a buffer manager 1010 that manages a memory configured as the output FIFO queue 1030. The buffer manager 1010 manages the output FIFO 1030 by storing data destined for an output port 518 of a line card, such as line card 516. To that end, the buffer manager 1010 maintains a head pointer 1032 used to load data into the FIFO 1030 and a tail pointer 1034 used to retrieve data from the FIFO. In response to a request for a flow bit indicating the status of the output buffer 1030, the buffer manager calculates the depth of the FIFO by essentially subtracting the value of the tail pointer 1034 from the value of the head pointer 1032. More specifically, the buffer manager performs circular subtraction to account for "wraps" in the buffer pointers. A conventional comparator 1050 then compares the calculated depth with a predetermined threshold associated with the queue 1030 and generates a result that comprises a state of the flow bit.

Figure 11:
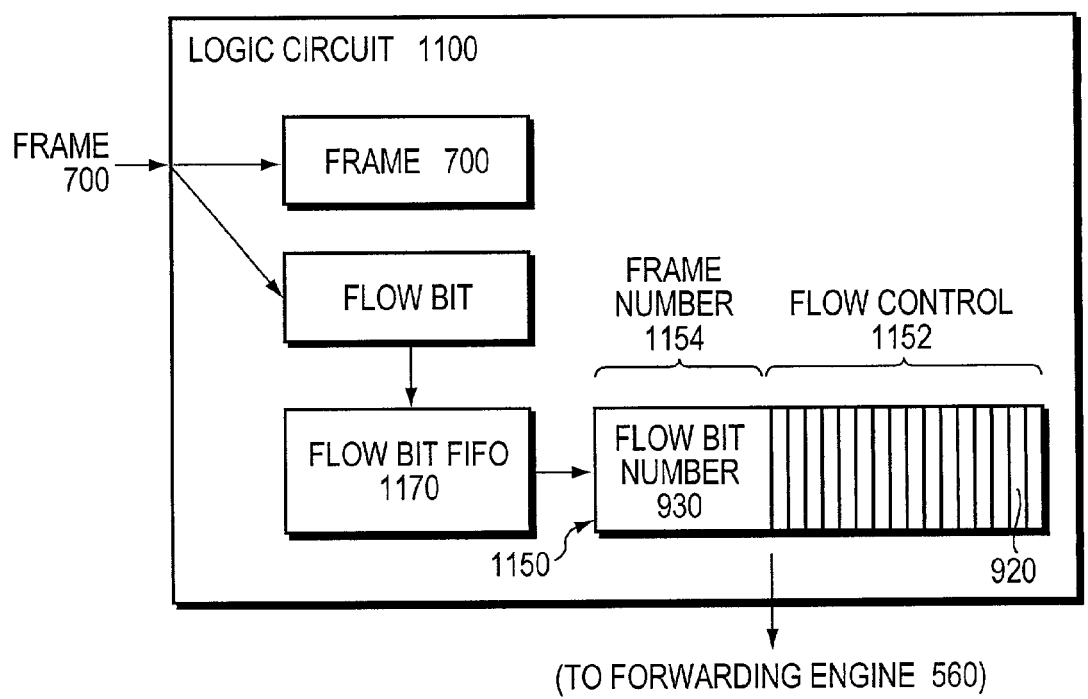
FIG. 11 is schematic block diagram of logic circuitry configured to generate a flow bit data structure in accordance with the present invention.

The flow bit is forwarded to the Barium ASIC where it is integrated within an encoded frame 700 as the framing bit for the frame, and is transported over the point-to-point links 542 to the Cobalt ASIC. FIG. 11 is schematic block diagram of logic circuitry 11100 located on backplane logic circuit 580 (i.e., the Cobalt ASIC) of the PRE 570 and configured to generate a flow bit data structure in accordance with the present invention. The logic circuit 1100 parses the flow bit from the frame 700 and merges that bit with other flow bits from the other (e.g., 15) line cards into a 32-bit flow bit data structure 11150. The flow bit data structure 1150 is preferably constructed by a flow bit FIFO 1170 of the interconnect receiver circuitry.

The flow bit data structure 1150 represents a portion of a context provided to the forwarding engine 560 every other frame number (i.e., every 90 nsecs). The data structure 1150 includes a flow control field 1152 for storing the flow bits 920 received from the line cards and a frame number field 1154 for storing the 16-bit flow bit number 930 generated by flow bit circuit 900 at the receiver. The content of the flow control field 1152 provides the current flow bit for each of the 16 line cards, whereas the flow bit number identifies the channel number associated with each line card. Using the data structure 1150, the scheduler firmware 562 on the forwarding engine 560 decides when to forward packets to the output FIFO queues on the line cards.

Advantageously, the flow bit mechanism and technique manages a per-channel-to-line depth of the output buffers and conveys that status to the PRE through use of a 1-bit threshold indicator of each buffer depth with tight guarantees on the sample rate. Slower channels are sampled infrequently since they cannot "drain" quickly enough to require frequent sampling. Faster channels are sampled more often but at evenly spaced intervals. The output buffers are kept as small as possible to minimize the time between a scheduling decision on the PRE and the actual transmission of a packet over the output interface. Such a short time interval obviates the need for the line card to provide any "fancy" queuing primitives. Moreover, shallow buffers enable efficient management of PDV and low speedup interconnect bandwidth.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for conveying per-channel flow control information pertaining to status of output buffers located on line cards to a forwarding engine of an intermediate network node, the method comprising the steps of:

comparing a depth of each output buffer with a predetermined threshold value;

generating a state of a flow bit for each output buffer associated with an output channel; and providing the state of the flow bit to the forwarding engine at a time interval, the state of the flow bit denoting that data is accepted at the output buffer if the depth of the buffer is less than the predetermined threshold value, and the state of the flow bit denoting that data is susceptible to overflow at the output buffer if the depth of the output buffer is greater than the predetermined threshold, and the length of the time interval proportional to the bandwidth of the channel, such that the state of the flow bit is provided more often to the forwarding engine for a higher bandwidth channel than for a lower bandwidth channel.

2. The method of claim 1 wherein the step of generating comprises the step of defining the flow bit to reflect a current state of the output buffer rather than a change in state of that buffer.

3. The method of claim 2 wherein the step of defining further comprises the step of asserting the flow bit as long as the output buffer can one of accept and not accept data.

4. The method of claim 1 further comprising the step of organizing the output buffer as a first-in, first-out (FIFO) queue.

5. The method of claim 1 further comprising the step of transporting data from the line cards to the forwarding engine over interconnect links of the node.

6. The method of claim 5 wherein the step of providing comprises the step of carrying each flow bit over the interconnect links in connection with a time division multiplex (TDM) arrangement of the node.

7. The method of claim 6 wherein the step of carrying comprises the step of periodically transmitting one flow bit from each line card to the forwarding engine over the interconnect links.

8. The method of claim 6 wherein the step of carrying comprises the step of multiplexing each flow bit as a logically separate signal from the data.

9. The method of claim 8 wherein the step of multiplexing comprises the step of multiplexing each flow bit onto an output channel through imposition of a framing structure, thereby associating sets of flow bits with channels on the line cards.

10. An apparatus configured to convey per-channel flow control information pertaining to status of output buffers located on line cards to a forwarding engine of a router, the apparatus comprising:
   a flow bit circuit configured to compare a depth of each output buffer with a predetermined threshold value and generate a state of a flow bit for each output buffer associated with an output channel, the state of the flow bit denoting that data is accepted at the output buffer if the depth of the buffer is less than the predetermined threshold value, and the state of the flow bit denoting that data is susceptible to overflow at the output buffer if the depth of the output buffer is greater than the predetermined threshold value; and
   an interconnect system having a time division multiplex (TDM) arrangement adapted to carry each flow bit to the forwarding engine, the TDM arrangement multiplexing each flow bit onto an output channel through imposition of a framing structure, thereby associating sets of flow bits with channels on the line cards, the interconnect system configured to provide each flow bit to the forwarding engine at a time interval proportional to the bandwidth of the channel, such that a flow bit is provided more often to the forwarding engine for a higher bandwidth channel than for a lower bandwidth channel.

11. The apparatus of claim 10 wherein the flow bit circuit is located on each line card and is configured to perform a threshold measurement to generate the flow bit state every time a flow bit for the channel is sent to a scheduler of the forwarding engine.

12. The apparatus of claim 10 wherein the flow bit circuit comprises:
   a memory configured as the output buffer; and
   a buffer manager configured to manage the output buffer by storing data destined for an output port of a line card.

13. The apparatus of claim 12 further comprising:
   a head pointer maintained by the buffer manager to load data into the output buffer;
   a tail pointer maintained by the buffer manager to retrieve data from the buffer;
   means for subtracting the tail pointer from the head pointer to calculate the depth of the buffer; and
   means for comparing the calculated depth with the predetermined threshold value to determine the state of the flow bit.

14. The apparatus of claim 13 wherein the output buffer is organized as a first-in, first-out (FIFO) queue.

15. The apparatus of claim 10 wherein the output buffer is organized as a first-in, first-out (FIFO) queue.

16. An apparatus configured to convey flow control information pertaining to status of output buffers of line cards to a forwarding engine, the apparatus comprising:
   a flow bit circuit configured to compare a depth of each output buffer with a predetermined threshold value and generate a state of a flow bit for each output buffer associated with an output channel, the state of the flow bit denoting that data is accepted at the output buffer if the depth of the buffer is less than the predetermined threshold value, and the state of the flow bit denoting that data is susceptible to overflow at the output buffer if the depth of the output buffer is greater than the predetermined threshold value; and
   an interconnect system having a time division multiplex (TDM) arrangement adapted to carry each flow bit to the forwarding engine, the TDM arrangement multiplexing each flow bit onto an output channel through imposition of a framing structure, thereby associating sets of flow bits with channels on the line cards, and wherein the TDM arrangement transports each flow bit over the interconnect system as out-of-band flow information within a framing bit of a frame.

17. The apparatus of claim 16 further comprising a logic circuit coupled to the forwarding engine and configured to generate a flow bit data structure including a flow control field for storing a flow bit received from each line card and a frame number field for storing a flow bit number.

18. The apparatus of claim 17 wherein the logic circuit parses the flow bit from the framing bit of the frame and merges that bit with other flow bits from the other line cards into the flow control field of the flow bit data structure.

19. The apparatus of claim 18 wherein the flow bit data structure is provided to the forwarding engine and processed by a scheduler to determine when to forward data to the output buffers on the line cards.

20. An apparatus configured to convey per-channel flow control information pertaining to status of output buffers located on line cards to a forwarding engine of a router, the apparatus comprising:
   means for comparing a depth of each output buffer with a predetermined threshold value;
   means for generating a state of a flow bit for each output buffer associated with an output channel, the state of the flow bit denoting that data is accepted at the output buffer if the depth of the buffer is less than the predetermined threshold value, and the state of the flow bit denoting that data is susceptible to overflow at the output buffer if the depth of the output buffer is greater than the predetermined threshold value; and
   means for carrying each flow bit to the forwarding engine, the means for carrying multiplexing each flow bit onto an output channel through imposition of a framing structure, thereby associating sets of flow bits with channels on the line cards, the means for carrying to provide each flow bit to the forwarding engine at a time interval proportional to the bandwidth of the channel, such that a flow bit is provided more often to the forwarding engine for a higher bandwidth channel than for a lower bandwidth channel.

21. The apparatus of claim 20 wherein the means for comparing comprises a flow bit circuit of a line card.

22. The apparatus of claim 20 wherein the means for generating comprises a flow bit circuit of a line card.

23. The apparatus of claim 20 wherein the means for carrying comprises an interconnect system having a time division multiplex arrangement.

24. A computer readable medium encoded with executable program instructions for conveying per-channel flow control information pertaining to status of output buffers located on line cards to a forwarding engine of an intermediate network node, the executable program instructions comprising program instructions for:
   comparing a depth of each output buffer with a predetermined threshold value;
   generating a state of a flow bit for each output buffer associated with an output channel; and
   providing the state of the flow bit to the forwarding engine at a time interval, the state of the flow bit denoting that data is accepted at the output buffer if the depth of the buffer is less than the predetermined threshold value, and the state of the flow bit denoting that data is susceptible to overflow at the output buffer if the depth of the output buffer is greater than the predetermined threshold, and the length of the time interval proportional to the bandwidth of the channel, such that the state of the flow bit is provided more often to the forwarding engine for a higher bandwidth channel than for a lower bandwidth channel.

25. The computer readable medium of claim 24 wherein the program instruction for providing comprises program instructions for:
   indicating to the forwarding engine that data can be accepted at the output buffer if the depth of the buffer is less than the predetermined threshold value; and
   indicating to the forwarding engine that no further data can be reliably accepted at the output buffer if the depth of the buffer is greater than the predetermined threshold value.

26. The computer readable medium of claim 24 wherein the program instruction for generating comprises the program instruction for defining the flow bit to reflect a current state of the output buffer rather than a change in state of that buffer.

27. The computer readable medium of claim 24 further comprising a program instruction for transporting data from the line cards to the forwarding engine over interconnect links of the node.

28. The computer readable medium of claim 27 wherein the program instruction for providing comprises the program instruction for carrying each flow bit over the interconnect links in connection with a time division multiplex (TDM) arrangement of the node.

29. A method for conveying overflow information to a forwarding engine of a router, comprising:
   maintaining a buffer for packet data associated with a channel;
   comparing a depth of each buffer with a predetermined threshold value;
   generating a state of a flow bit for the buffer, the state of the flow bit denoting that data is susceptible to overflow at the output buffer if the depth of the buffer is greater than the predetermined threshold value; and
   providing the state of the flow bit to the forwarding engine at a time interval, the length of the time interval chosen in response to the bandwidth of the channel.

30. A router, the router conveying overflow information to a forwarding engine of the router, comprising:
   means for maintaining a buffer for packet data associated with a channel;
   means for comparing a depth of each buffer with a predetermined threshold value;
   means for generating a state of a flow bit for the buffer, the state of the flow bit denoting that data is susceptible to overflow at the output buffer if the depth of the buffer is greater than the predetermined threshold value; and
   means for providing the state of the flow bit to the forwarding engine at a time interval, the length of the time interval chosen in response to the bandwidth of the channel.

31. A method for conveying flow control information for an output buffer associated with a channel to a forwarding engine of a network device, the method comprising the steps of:
   comparing a depth the output buffer with a threshold value for the output buffer;
   in response to the depth the output buffer being greater than the threshold value, setting a flow bit of a frame;
   transmitting the frame with the flow bit to the forwarding engine at a time interval, the length of the time interval substantially proportional to the bandwidth of the channel, such that frames with flow bits are sent more often to the forwarding engine for higher bandwidth channels than for lower bandwidth channels.

32. The method of claim 31 wherein the step of transmitting further comprises the step of:
   determining when to transmit the frame with the flow bit using a frame cycle, the length of the frame cycle selected to be at least as long as a time period necessary to send a minimum length packet over a minimum bandwidth channel of the network device.

33. The method of claim 32 wherein the step of determining further comprises the step of:
   assigning two or more substantially evenly spaced time slots in the frame cycle to the channel; and
   using each of the two or more time slots in the frame cycle to transmit the frame.

34. The method of claim 32 wherein the step of determining further comprises the step of:
   assigning a frame number to each frame, the frame number based upon a position of the frame in the frame cycle; and
   setting a bit of the frame number as the flow bit.

35. The method of claim 34 wherein the bit of the frame number is a least significant bit.

36. The method of claim 31 further comprising the step of:
   organizing the output buffer as a first-in, first-out (FIFO) queue.

37. An network device configured to conveying flow control information for an output buffer associated with a channel to a forwarding engine, the network device comprising:
   a flow bit circuit configured to compare a depth of the output buffer with a threshold value for the output buffer, the flow bit circuit further configured to, in response to the depth the output buffer being greater than the threshold value, set a flow bit of a frame;
   an interconnect system configured to transport the frame with the flow bit to the forwarding engine at a time interval, the length of the time interval substantially proportional to the bandwidth of the channel, such that frames with flow bits are sent more often to the forwarding engine for higher bandwidth channels than for lower bandwidth channels.

38. The network device of claim 37 wherein the interconnect system is further configured to determine when to transmit the frame with the flow bit using a frame cycle, the length of the frame cycle selected to be at least as long as a time period necessary to send a minimum length packet over a minimum bandwidth channel of the network device.

39. The network device of claim 38 wherein the interconnect system is further configured to assign two or more substantially evenly spaced time slots in the frame cycle to the channel and use each of the two or more time slots in the frame cycle to transmit the frame.

40. The network device of claim 38 further comprising:
   a translation circuit configured to assign a bit of a frame number to represent the flow bit, the frame number based upon a position of the frame in the frame cycle.

41. The network device of claim 40 wherein the bit of the frame number is a least significant bit.

42. The network device of claim 41 wherein the output buffer is a first-in, first-out (FIFO) queue.

\* \* \* \* \*